United States Patent Office 2,696,434
Patented Dec. 7, 1954

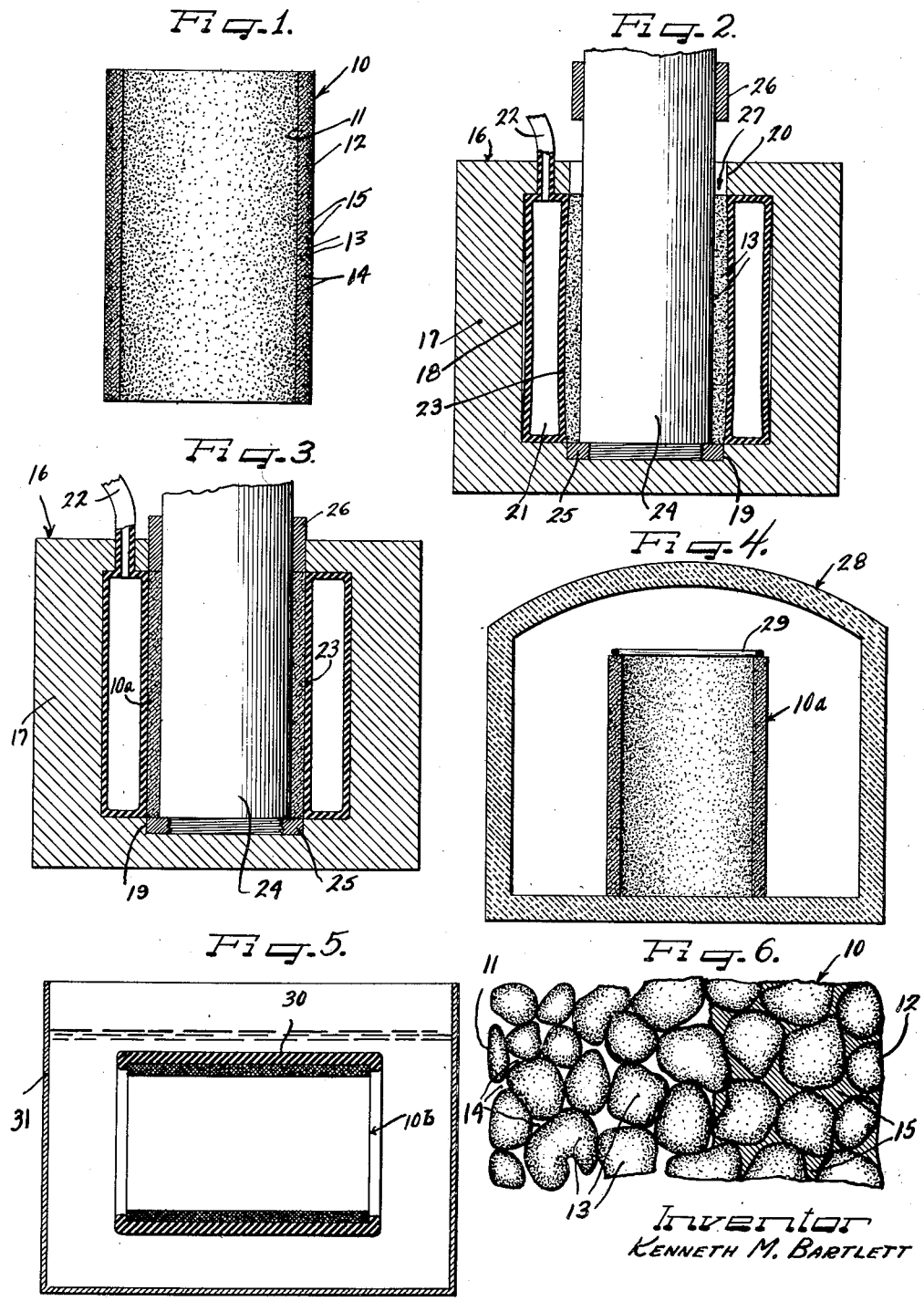
Inventor
KENNETH M. BARTLETT

2,696,434
PROCESS OF PRODUCING CYLINDER SLEEVES

Kenneth M. Bartlett, South Euclid, Ohio, assignor to Thompson Products, Inc., Cleveland, Ohio, a corporation of Ohio Application October 2, 1947, Serial No. 777,403

3 Claims. (Cl. 75—208)

This invention relates to cylinder sleeves such as liners, barrels, and the like piston-receiving cylinders for internal combustion engines, and more particularly deals with cylinder sleeves composed of powdered metal and having a porous inner face portion and a relatively non-porous outer portion.

The term "cylinder sleeve" as used herein designates cylinder liners, engine barrels, and the like sleeve members which receive the pistons of internal combustion engines. Such sleeves must afford good wearing characteristics and must have good sealing relationship with the piston rings on the pistons operating in the sleeves. In addition, the sleeves must be capable of withstanding high temperatures and corrosive atmospheres commonly encountered in internal combustion engine operation.

According to this invention, cylinder sleeves are formed from powdered metal, preferably iron or bearing bronzes such as Phosphor bronzes, by powder metallurgy practice involving briquetting the metal powder under high pressures followed by sintering and infiltration with a lower melting metal at elevated temperatures. The resulting sintered infiltrated sleeve is relatively non-porous and is then subjected to a treatment for dissolving the infiltrated metal out of the inner face portions of the sleeve so as to render these portions porous. The outer face portions of the sleeves, however, are sealed with the infiltrated metal and the sleeves will not leak. Nevertheless, the porous inner faces of the sleeves will absorb oil or other lubricants used in the operation of the internal combustion engine to maintain a well lubricated smooth face for sealing coaction with the piston rings. The size of the pores can be controlled by particle size of the powder and by the briquetting pressure to obtain a capillary action effect along the inner wall of the sleeve which will draw lubricant to feed the bearing face of the sleeve. This lubricated face resists wear, prevents ring seizure, and materially outlasts sleeves composed of solid metals. The lubricant will be held in the pores even after prolonged standing.

It is, then, an object of this invention to provide a powdered metal cylinder sleeve for internal combustion engines.

Another object of the invention is to provide a powdered metal cylinder sleeve for internal combustion engines which has a porous inner wall and a relatively non-porous outer wall.

A still further object of the invention is to provide a powdered iron cylinder sleeve for internal combustion engines which is infiltered on its outer wall portion only with a sealing metal, and which has a porous inner wall portion capable of drawing up lubricant by capillary action to maintain the bearing face of the sleeve in a lubricated condition during operation of an engine in which the sleeve is mounted.

Another object of the invention is to provide a cylinder sleeve for internal combustion engines wherein the entire body of the sleeve is composed of powdered metal and wherein the outer wall portion only of the sleeve is sealed with a lower melting metal.

Other and further objects of the invention will be apparent to those skilled in the art from the following detailed description of the annexed sheet of drawings which, by way of a preferred example only, illustrates a cylinder sleeve and a method of making it according to this invention.

On the drawings:

Figure 1 is an axial cross-sectional view of a cylinder sleeve according to this invention and diagrammatically illustrating the porous and non-porous portions of the sleeve.

Figure 2 is a cross-sectional view of a molding die for forming a compressed briquette of metal powder to produce the cylinder sleeve of this invention and showing the mold parts in opened positions.

Figure 3 is a view similar to Figure 4 but showing the parts in closed position.

Figure 4 is a diagrammatic view illustrating the manner in which the compressed molded briquette produced in the dies of Figures 2 and 3 is sintered and infiltered with copper.

Figure 5 is a diagrammatic view illustrating the manner in which the infiltered cylinder sleeve is etched to remove the infiltration metal from the inner face thereof for producing a porous inner wall.

Figure 6 is a magnified sectional view showing the structure of the cylinder sleeve wall.

As shown on the drawing:

In Figure 1 the reference numeral 10 designates a powdered metal cylinder sleeve for an internal combustion engine. This sleeve 10 has a porous inner wall 11 and a relatively non-porous outer wall 12. The porous wall 11 slidably receives a piston ring-equipped piston and sealingly engages the rings of the piston (not shown). The outer wall 12, in some installations, is in contact with coolant that is circulated through the block of the engine. This wall is impervious in order that the coolant cannot leak through the sleeve to the piston chamber-defining wall thereof. As shown, the inner wall 11 is formed of powdered metal particles 13 with bores or open spaces 14 therebetween. The powdered metal particles in the outer wall 12, however, are surrounded by an infiltrated metal 15 such as copper. This infiltrated metal fills the pores 14.

The cylinder 10 is formed as shown in Figures 2 and 3 in a suitable molding apparatus 16. This apparatus 16 includes a die block 17 with a cylindrical recess 18 therein having a blind well portion 19 at the bottom thereof and a reduced-diameter entrance hole 20 at the top thereof. A sleeve-like bag 21 composed of non-porous, flexible material is seated in the recess 18 and has a stem 22 projecting through the top of the block 17 for filling the bag with fluid. The bag has a cylindrical inner wall 23 of the same diameter as the entrance hole 20 and adapted, when properly inflated, to continue from the entrance hole 20 to the bottom of the mold cavity.

A center post or stake 24 fits freely through the entrance hole 20 and bag 21 and has a removable end cap or head 25 snugly seatable in the wall 19. This cap 25 coacts with the well 19 to position the post 24 in the center of the mold cavity so that it will provide a cylindrical mandrel concentric with the cylindrical wall 23 of the bag 21.

A sleeve 26 is slidable on the post 24 and is adapted to snugly fit in the entrance hole 20 for closing the top of the mold cavity or space 27 between the post 24 and the inner wall 23 of the bag 21. As shown in Figure 2, this sleeve 26 is in a raised position so that the entrance hole 20 is open and the powdered metal particles 13 can be poured through the hole 20 to fill the mold cavity 27. The bag 21 is in partially collapsed condition so that the particles can fall freely to the bottom of the mold cavity. The sleeve 26 can be used as a tamper to compact the particles in the cavity and insure a complete filling of the cavity.

After the mold cavity 27 is filled with powder, the sleeve 26 is held under pressure at the top of the cavity to close the entrance hole 20 as best shown in Figure 3. The mold cavity is thus sealed and is defined by the inner wall 23 of the bag 21, the post 24, the end cap or head 25 on the post, and the sleeve 26. Fluid, preferably a liquid, under pressure is then introduced into the bag 21 through the stem 22 and a commercial pressure of about 3000 pounds per square inch is built up in the mold cavity 27 for compacting the powder particles into a coherent molded briquette 10a in the shape of the cylinder sleeve 10. The fluid pressure in the bag 21 is exerted along the entire outer wall of the sleeve and the pressure is distributed uniformly throughout the entire length of the mold cavity so that a uniformly compacted body is produced.

The briquette 10a is composed of substantially pure iron or Phosphor bronze particles of a size within the range of about 10 to above 200 mesh. The compressed briquette 10a has a porosity of about 10 to 35% and is self-sustaining and in the nature of a hard, porous body. The porosity can be controlled by particle size of the powder and by briquetting pressures to create capillary passages in the sleeve which are effective to draw up oil from the crankcase of an engine equipped with the sleeve to lubricate the bearing wall of the sleeve. The capillary active pores will hold the lubricant even when the engine is idle, so that, upon starting, the piston chamber walls will be amply lubricated. Piston seizure and scoring are thus avoided.

If desired, graphite powder in amounts of 1% or less can be mixed with the iron powder to carburize the iron.

After the molding operation, the briquette 10a is readily stripped from the mold by deflating the bag and by raising the post 24 and sleeve 26 out of the mold and die hole 20. The end cap 25 can then be removed from the post and the sleeve 26 can be used to strip the cylinder sleeve body 10a off of the post.

If desired, the rubber sleeve wall 23 could be clamped at its ends to the post 24 for confining the powder therein and the clamped assembly could then be placed in an autoclave to be subjected to the desired pressure for briquetting.

As shown in Figure 4, the briquette 10a is introduced into a furnace 28 with a ring of copper mounted on an end edge of the cylinder. The furnace 28 is heated above the melting point of the coper ring 29. Temperatures between 1125 and 1250° C. are suitable. The atmosphere in the furnace is clean and dry, and the heat treatment is continued until all of the copper is melted and until all of the pores of the body 10a are completely filled with copper. A time period of about 1 to 2 hours is usually sufficient for this purpose. The copper is preferably alloyed with about 5% manganese and 1% silicon, although, if desired, substantially pure copper can be used. After the infiltration has been completed, the infiltrated body is cooled down and a non-porous cylinder sleeve body 10b, shown in Figure 5, results. As therein shown, this sleeve 10b is covered with a rubber sleeve 30 but the entire inner face of the sleeve 10b is uncovered. The rubber-covered assembly is inserted in a tank 31 containing a solution that will selectively dissolve out the copper from the iron. Suitable materials are chromic acid, trichloroacetic acid, sodium cyanide, and the like. The sleeve 10b is allowed to remain in the bath in the tank 31 for a sufficient time until the copper is dissolved out of the inner face of the sleeve to a desired depth, at least about 0.001 to 0.004 inch. The finished sleeve 10 is thereby produced. The sleeve 10, as shown in Figure 6, has the iron particles 13 throughout the entire thickness thereof but the particles on the inner face 11 of the sleeve are surrounded by voids 14 while the particles on the outer face 12 of the sleeve are closed up by the copper matrix 15. The cylinder sleeve next has the inner face 11 ground and honed to the desired finish and size and the sleeve is then ready for use.

In some installations, as, for example, where the sleeve is used as a dry liner, copper infiltration may not be used. In such installations the briquetted body 10a is subjected to the sintering treatment in the furnace 28 without being contacted with copper 29. Of course, the etching treatment illustrated in Figure 5 is then unnecessary.

From the above descriptions it will be understood that this invention provides a cylinder sleeve for internal combustion engines capable of absorbing lubricant into the pores of its inner face, but having a relatively non-porous outer wall capable of resisting leakage of coolant or the like into the piston chamber-defining inner wall.

It will, of course, be understood that various details of the method and article may be varied through a wide range without departing from the principles of this invention and it is, therefore, not the purpose to limit the patent granted hereon otherwise than necessitated by the scope of the appended claims.

I claim as my invention:

1. The process of making a cylinder sleeve which includes the steps of producing a cylindrical briquette by a powder metallurgical process as a coherent article having a porous skeleton structure, completely impregnating the briquette with metal to form a non-porous cylindrical sleeve having an inner bore face and an outer wall, and etching the bore face to dissolve out the impregnating metal therefrom to a depth outward from the bore face to provide a porous lubricant retaining zone in the bore face and materially inward from the outer wall to preserve a non-porous wall of appreciable thickness extending from said zone to the outer wall.

2. The process of making a cylinder sleeve which includes the steps of producing a cylindrical briquette by a powder metallurgical process as a coherent article having a porous skeleton structure, impregnating the briquette with metal to form a non-porous sleeve having an inner bore face and an outer sleeve face, blocking said outer sleeve face, and immersing the non-porous sleeve in an etching fluid a sufficient time to dissolve out the impregnating metal from the bore face to a depth sufficient to provide a porous lubricant retaining zone in the bore face while preserving a non-porous wall of appreciable thickness extending from said zone to said outer sleeve face.

3. The process of making a cylinder sleeve which includes the steps of producing a cylindrical briquette by a powder metallurgical process as a coherent article having a porous skeleton structure, impregnating the briquette with metal to form a non-porous sleeve having inner and outer faces, and etching the inner face only to dissolve out the impregnating metal therefrom to a depth of at least 0.001 inch while preserving a non-porous wall of appreciable thickness extending inwardly from said outer face toward said inner face.

References Cited in the file of this patent

UNITED STATES PATENTS

| Number | Name | Date |
| --- | --- | --- |
| 1,226,470 | Coolidge | May 15, 1917 |
| 1,600,961 | Payne | Sept. 21, 1926 |
| 1,689,030 | Holland | Oct. 23, 1928 |
| 1,853,385 | Spade | Apr. 12, 1932 |
| 1,927,626 | Calkins | Sept. 19, 1933 |
| 2,042,635 | Schellens | June 2, 1936 |
| 2,096,924 | Schwarzkopf | Oct. 26, 1937 |
| 2,154,288 | Scholz | Apr. 11, 1939 |
| 2,191,936 | Lenel | Feb. 27, 1940 |
| 2,192,792 | Kurtz | Mar. 5, 1940 |
| 2,341,293 | Rives | Feb. 8, 1944 |
| 2,422,439 | Schwarzkopf | June 17, 1947 |
| 2,462,045 | Wulff | Feb. 15, 1949 |
| 2,518,253 | Reis | Aug. 8, 1950 |

FOREIGN PATENTS

| Number | Country | Date |
| --- | --- | --- |
| 495,824 | Great Britain | Nov. 14, 1938 |